US012682147B1

(12) United States Patent
Chonnad et al.

(10) Patent No.: US 12,682,147 B1
(45) Date of Patent: Jul. 14, 2026

(54) IDENTIFYING CIRCUIT ELEMENTS AND/OR PORTS FOR THREAT ANALYSIS AND RISK ASSESSMENT

(71) Applicant: Synopsys, Inc., Mountain View, CA (US)

(72) Inventors: Shivakumar Shankar Chonnad, San Jose, CA (US); Fadi Maamari, San Jose, CA (US); Chandan Kumar, Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 745 days.

(21) Appl. No.: 18/173,665

(22) Filed: Feb. 23, 2023

(51) Int. Cl.
*G06F 30/394* (2020.01)
*G06F 119/02* (2020.01)

(52) U.S. Cl.
CPC ........ *G06F 30/394* (2020.01); *G06F 2119/02* (2020.01)

(58) Field of Classification Search
CPC ........................... G06F 30/394; G06F 2119/02
USPC ........................................................ 716/100
See application file for complete search history.

(56) References Cited

U.S. PATENT DOCUMENTS

| | | | | |
|---|---|---|---|---|
| 11,809,563 | B2 * | 11/2023 | Katkoori | G06F 21/556 |
| 2009/0113550 | A1 * | 4/2009 | Costa | G06F 21/55 |
| | | | | 726/25 |
| 2009/0309627 | A1 * | 12/2009 | Ranganathan | H03K 19/0033 |
| | | | | 326/14 |
| 2011/0173584 | A1 * | 7/2011 | Chen | G06F 30/327 |
| | | | | 716/108 |
| 2022/0207224 | A1 * | 6/2022 | Chonnad | G06F 30/33 |
| 2023/0020547 | A1 * | 1/2023 | Katkoori | G06F 21/556 |

* cited by examiner

*Primary Examiner* — Suchin Parihar
(74) *Attorney, Agent, or Firm* — Laxman Sahasrabuddhe; Park, Vaughan, Fleming & Dowler LLP

(57) ABSTRACT

A first set of ports and/or circuit elements in a circuit design may be received, where the first set of ports and/or circuit elements is expected to cause damage if the first set of ports and/or circuit elements is compromised. A second set of ports and/or circuit elements in the circuit design may be determined by performing forward path tracing from the first set of ports and/or circuit elements, backward path tracing from the first set of ports and/or circuit elements, or both forward and backward path tracing from the first set of ports and/or circuit elements. A report may be generated based on the second set of ports and/or circuit elements in the circuit design, where the report is used for performing threat analysis and risk assessment for the circuit design.

20 Claims, 9 Drawing Sheets

Receive a first set of ports and/or circuit elements in a circuit design, where the first set of ports and/or circuit elements is expected to cause damage if the first set of ports and/or circuit elements is compromised ⟶ 602

Determine a second set of ports and/or circuit elements in the circuit design by performing forward path tracing from the first set of ports and/or circuit elements, backward path tracing from the first set of ports and/or circuit elements, or both forward and backward path tracing from the first set of ports and/or circuit elements ⟶ 604

Generate a report based on the second set of ports and/or circuit elements in the circuit design, where the report may identify one or more of threat scenarios and damage scenarios in the circuit design ⟶ 606

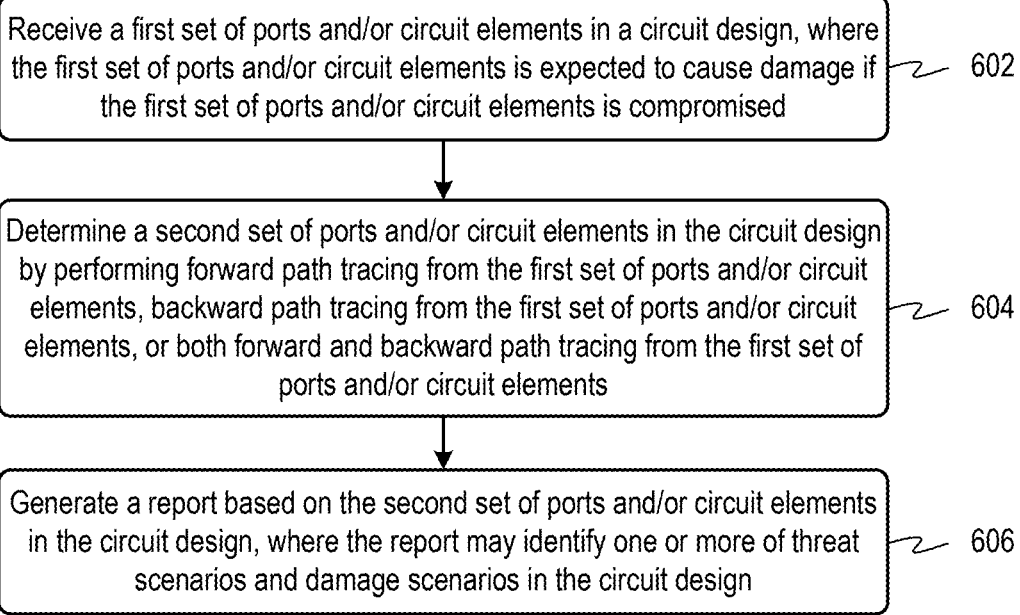

Receive a first set of ports and/or circuit elements in a circuit design, where the first set of ports and/or circuit elements is expected to cause damage if the first set of ports and/or circuit elements is compromised ⌐ᴧ⌐ 602

Determine a second set of ports and/or circuit elements in the circuit design by performing forward path tracing from the first set of ports and/or circuit elements, backward path tracing from the first set of ports and/or circuit elements, or both forward and backward path tracing from the first set of ports and/or circuit elements ⌐ᴧ⌐ 604

Generate a report based on the second set of ports and/or circuit elements in the circuit design, where the report may identify one or more of threat scenarios and damage scenarios in the circuit design ⌐ᴧ⌐ 606

FIG. 6

IDENTIFYING CIRCUIT ELEMENTS AND/OR PORTS FOR THREAT ANALYSIS AND RISK ASSESSMENT

TECHNICAL FIELD

The present disclosure generally relates to an electronic design automation (EDA) system. More specifically, the present disclosure relates to identifying circuit elements and/or ports for threat analysis and risk assessment.

BACKGROUND

Integrated circuit (IC) designs, e.g., System-on-Chip (SoC) designs, may be used in many applications which include, but are not limited to, networking applications and automotive applications. A malicious actor may attempt to disable, disrupt, and/or modify the operation of an IC design.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 6 illustrates a process for identifying circuit elements and/or ports for threat analysis and risk assessment in accordance with some embodiments described herein.

SUMMARY

Figures 1A, 1B:
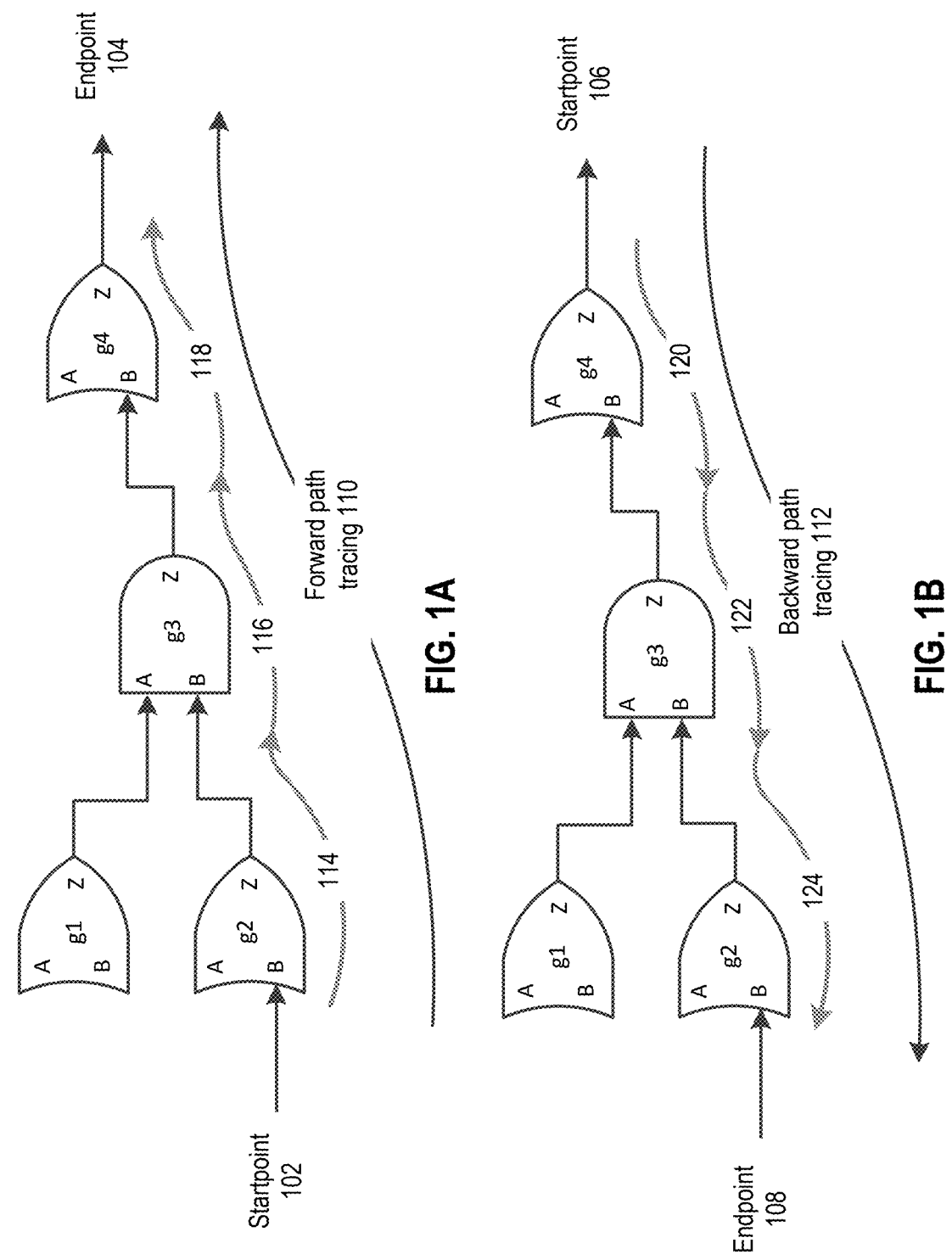
FIGS. 1A-1B illustrate forward and backward path tracing using structural analysis in accordance with some embodiments described herein.

A first set of ports and/or circuit elements in a circuit design may be received, where the first set of ports and/or circuit elements is expected to cause damage if the first set of ports and/or circuit elements is compromised. A second set of ports and/or circuit elements in the circuit design may be determined by performing forward path tracing from the first set of ports and/or circuit elements, backward path tracing from the first set of ports and/or circuit elements, or both forward and backward path tracing from the first set of ports and/or circuit elements. A report may be generated based on the second set of ports and/or circuit elements in the circuit design, where the report may identify one or more of threat scenarios and damage scenarios in the circuit design. The report may be used for performing threat analysis and risk assessment for the circuit design.

In some embodiments described herein, the circuit design may have multiple modes, where different portions of the circuit design are activated in each mode, and where for each mode, the forward path tracing from the first set of ports and/or circuit elements, backward path tracing from the first set of ports and/or circuit elements, or both forward and backward path tracing from the first set of ports and/or circuit elements is performed only on activated portions of the circuit design. In some embodiments described herein, the report includes multiple sections, and where each section corresponds to a mode.

In some embodiments described herein, observability probabilities associated with the second set of ports and/or circuit elements may be computed. In these embodiments, the report may include the observability probabilities. In some embodiments, the report may rank the second set of ports and/or circuit elements based on the observability probabilities. In some embodiments, the report may include a subset of the second set of ports and/or circuit elements which have observability probabilities that are greater than a threshold observability probability.

In some embodiments described herein, threat detection circuitry may be added for a subset of the second set of ports and/or circuit elements which have observability probabilities that are greater than a threshold observability probability.

DETAILED DESCRIPTION

Aspects of the present disclosure relate to identifying circuit elements and/or ports for threat analysis and risk assessment. It is desirable to protect IC designs from malicious actors. Threat analysis and risk assessment (TARA) may be performed during an IC design flow to identify weaknesses in an IC design. In this disclosure, the term "asset" may refer to any object (e.g., an integrated circuit (IC) design or a portion thereof) which is desired to be protected from malicious actors. The term "weakness" may refer to a characteristic of an asset which may be exploited by a malicious actor. For example, a register may have the characteristic that the data stored in the register can be propagated to an output port where the data may be read. If the register stores sensitive data, then this characteristic is a weakness which may be exploited by a malicious user. The term "attack path" may refer to a set of deliberate actions which may be used to exploit a weakness in an asset. The term "vulnerability" may refer to a weakness which can be exploited by an attack path. If a malicious actor successfully attacks an asset (e.g., gains control of the asset), then the asset may be referred to as being "compromised." A compromised asset may cause damage if it is exploited by a malicious user.

Weaknesses in an IC design may be identified, where a weakness may be targeted by a malicious actor to disable, disrupt, and/or modify the behavior of the IC design. In general, a weakness may be present in any circuit element including, but not limited to, registers, ports, logic gates, and circuit blocks. For example, a register which stores an encryption key may be identified as a weakness, which may be a potential target for a malicious actor. Attack paths may then be determined to exploit one or more weaknesses. The terms "threat" or "threat scenario" may refer to a situation in which one or more weaknesses are exploited. The term "damage" or "damage scenario" may refer to the harm caused when one or more weaknesses are successfully exploited by a malicious actor. Suitable risk mitigation actions may be introduced in the IC design to detect the occurrence of a threat scenario (and optionally perform remedial actions) or prevent the threat scenario from occurring.

In complex IC designs, it may not be practical to manually determine attack paths in an IC design. Embodiments described herein may automatically determine attack paths in an IC design. The IC design may be modified to prevent the attack paths from being exploited and/or threat detection circuitry may be added to detect threat scenarios in which the attack paths are being exploited. For example, a potential weakness (e.g., a register port) in an IC design may be received. Some embodiments described herein may identify input ports of the IC design which may be used to attack the weakness, and output ports of the IC design which may be affected if the weakness is exploited. The set of input ports and the output ports may then be provided as part of a vulnerability analysis of the IC design (e.g., as per WP-08-05 in International Organization for Standardization/Society of Automotive Engineers (ISO/SAE) 21434 specification). Some embodiments described herein may add threat detection circuitry to detect threat scenarios in which the weakness is exploited.

Technical advantages of embodiments described herein include, but are not limited to, (1) comprehensive analysis of attack paths for exploiting a weakness in an IC design, (2) automatic identification of input ports which may be used to attack a weakness in the IC design, (3) automatic identification of output ports which may be affected when a weakness in the IC design is exploited, and (4) improvement in the security of IC designs (and of apparatuses which use IC designs) by improving the detection and/or prevention of attacks.

Some embodiments described herein use forward and/or backward tracing in an IC design to identify ports and/or circuit elements which are useful for performing threat analysis and risk assessment. Specifically, a port or a circuit element (e.g., a flip-flop or register) may be received. Forward tracing may be used to determine a forward cone of influence from the circuit element, and/or backward tracing may be used to determine a backward cone of influence from the circuit element. The forward and/or backward cones of influence may then be used for identifying attack paths and damage scenarios during threat analysis and risk assessment.

FIGS. 1A-1B illustrate forward and backward path tracing using structural analysis in accordance with some embodiments described herein.

The circuit shown in FIGS. 1A-1B may include gates g1, g2, g3, and g4, where each gate may include two input ports "A" and "B" and an output port "Z." Forward path tracing may include tracing input-to-output arcs from a startpoint to a set of endpoints. For example, forward path tracing 110 may begin at startpoint 102 (i.e., input port "B" of gate g2) and trace input-to-output arcs (e.g., input-to-output arcs 114, 116, and 118) to a set of endpoints (e.g., endpoint 104 which corresponds to the "Z" output of gate g4). Performing forward path tracing from a startpoint may generate a set of paths which may be referred to as the forward cone of influence from the startpoint. For example, the path from startpoint 102 to endpoint 104 is a path in the forward cone of influence from startpoint 102.

Backward path tracing may include tracing output-to-input arcs from a startpoint to a set of endpoints. For example, backward path tracing 112 may begin at startpoint 106 (i.e., output port "Z" of gate g4) and trace output-to-input arcs (e.g., output-to-input arcs 120, 122, and 124) to a set of endpoints (e.g., endpoint 108 which corresponds to the "B" input of gate g1). Performing backward path tracing from a startpoint may generate a set of paths which may be referred to as the backward cone of influence from the startpoint. For example, the path from startpoint 106 to endpoint 108 is a path in the backward cone of influence from startpoint 106.

Figure 2:
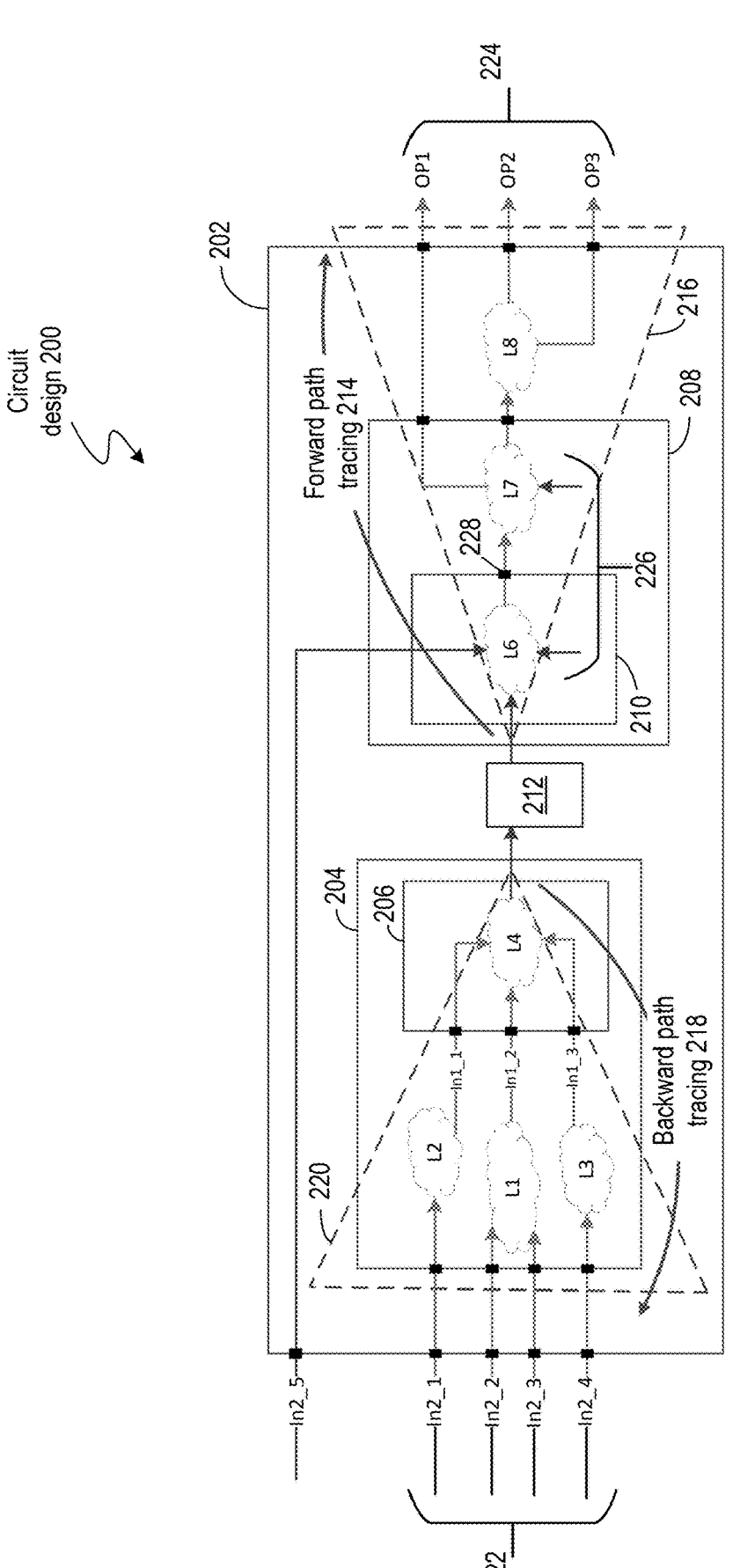
FIG. 2 illustrates identifying attack paths and damage scenarios based on a vulnerable circuit element in accordance with some embodiments described herein.

FIG. 2 illustrates identifying attack paths and damage scenarios based on a vulnerable circuit element in accordance with some embodiments described herein.

Circuit design 200 may include a top-level hierarchical circuit block 202. Top-level hierarchical circuit block 202 may include circuitry L8, circuit element 212, and circuit blocks 204 and 208. Circuit block 204 may include circuit block 206 and circuitries L1, L2, and L3. Circuit block 206 may include circuitry L4. Circuit block 208 may include circuit block 210 and circuitry L7. Circuit block 210 may include circuitry L6. Circuitries L6 and L7 may receive signals 226 from other parts of circuit design 200.

Circuit element 212 (e.g., a flip-flop) may be identified as a vulnerable circuit element. Forward path tracing 214 may be used to generate forward cone of influence 216 from an output port of circuit element 212 (e.g., the "Q" output of the flip-flop). Backward path tracing 218 may be used to generate backward cone of influence 220 from an input port of circuit element 212 (e.g., the "D" input of the flip-flop). Input ports 222 (which includes input ports In2_1, In2_2, In2_3, and In2_4, but does not include input port In2_5) of top-level hierarchical block 202 are in the backward cone of influence 220 and output ports 224 (which includes output ports OP1, OP2, and OP3) are in the forward cone of influence 216.

In some embodiments described herein, a report may be generated which includes the input ports of the top-level hierarchy (e.g., input ports 222) which are in the backward cone of influence (e.g., backward cone of influence 220) from the vulnerable circuit element (e.g., circuit element 212). In other words, the report may include input ports of the top-level hierarchy (e.g., input ports 222) which may potentially be used to attack the vulnerable circuit element. In some embodiments described herein, ports of intermediate hierarchies which are in the backward cone of influence may be included in the report. For example, ports In1_1, In1_2, and In1_3 may be included in the report.

In some embodiments described herein, a report may be generated which includes the output ports of the top-level hierarchy (e.g., output ports 224) which are in the forward cone of influence (e.g., forward cone of influence 216) from the vulnerable circuit element (e.g., circuit element 212). In other words, the report may include output ports of the top-level hierarchy (e.g., output ports 224) which may generate an undesired output (where the undesired output may cause damage) if the vulnerable circuit element (e.g., circuit element 212) is compromised. In some embodiments described herein, ports of intermediate hierarchies which are in the forward cone of influence may be included in the report. For example, port 228 may be included in the report.

Figure 3:
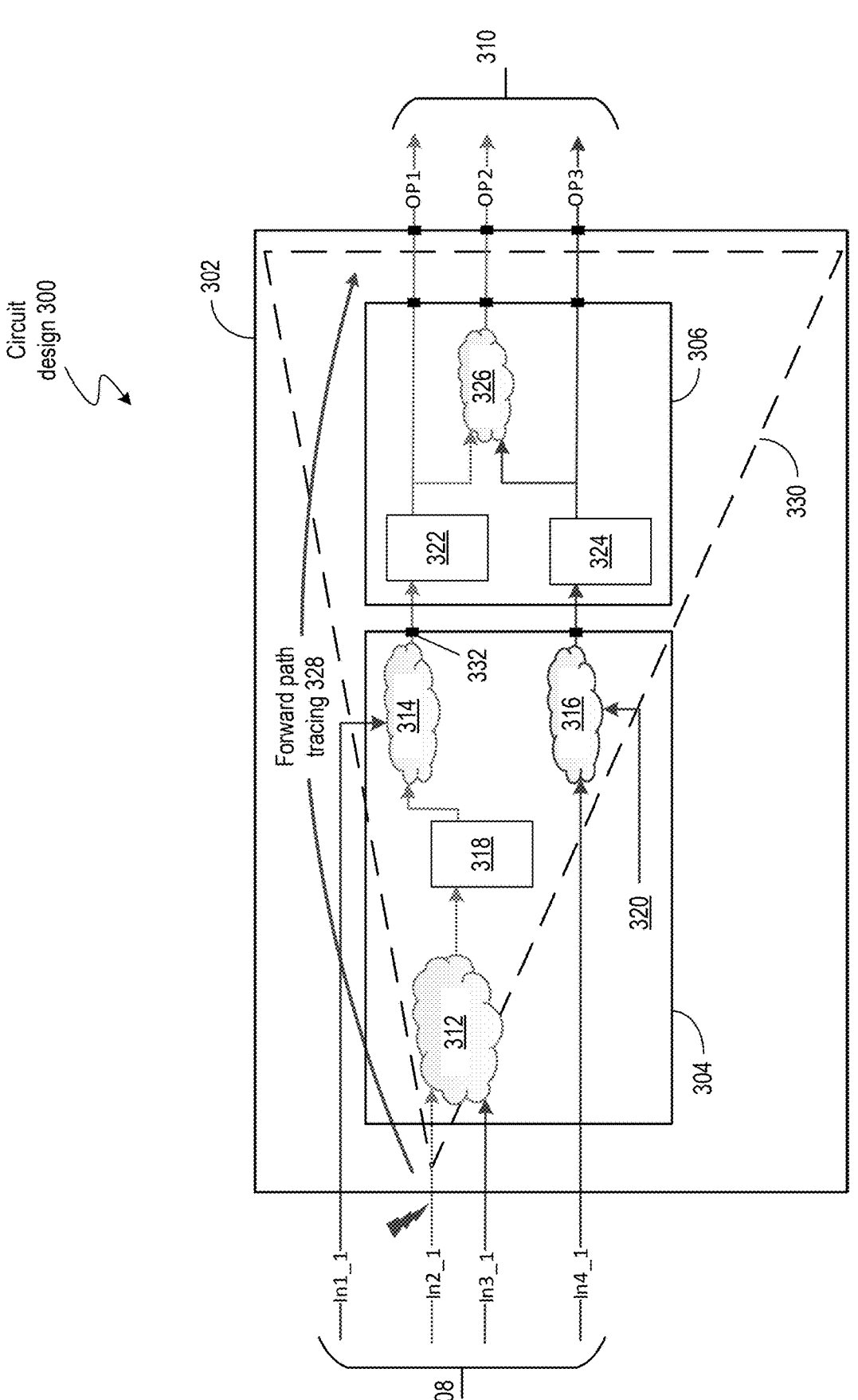
FIG. 3 illustrates identifying circuit elements impacted by an input port in accordance with some embodiments described herein.

FIG. 3 illustrates identifying circuit elements impacted by an input port in accordance with some embodiments described herein.

Circuit design 300 may include a top-level hierarchical circuit block 302. Top-level hierarchical circuit block 302 may include circuit blocks 304 and 306, input ports 308 (In1_1, In2_1, In3_1, and In4_1), and output ports 310 (OP1, OP2, and OP3). Circuit block 304 may include circuitries 312, 314, and 316, and circuit element 318 (e.g., a flip-flop). Circuitry 316 may receive signals 320 which may be generated by other parts of circuit design 300. Circuit block 306 may include circuit elements 322 and 324 (e.g., flip-flops) and circuitry 326.

An input port of circuit design 300 may be identified as a vulnerable input port. For example, input port In2_1 may be identified as a vulnerable input port. Forward path tracing 328 may be used to generate forward cone of influence 330 from input port In2_1. The forward cone of influence may span across multiple hierarchies in the circuit design. For example, forward cone of influence 330 spans across circuit blocks 304 and 306 and the top-level hierarchical circuit block 302.

In some embodiments described herein, a report may be generated which includes ports and circuit elements which are in the forward cone of influence. For example, the report may include circuit elements 318 and 322 (but may not include circuit element 324) and output ports OP1 and OP2 (but may not include output port OP3). In particular, the registers or flip-flops that are within the forward cone of influence may be included in the report. Ports of circuit blocks at lower levels of hierarchies (e.g., port 332 of circuit block 304) may also be included in the report.

Figure 4:
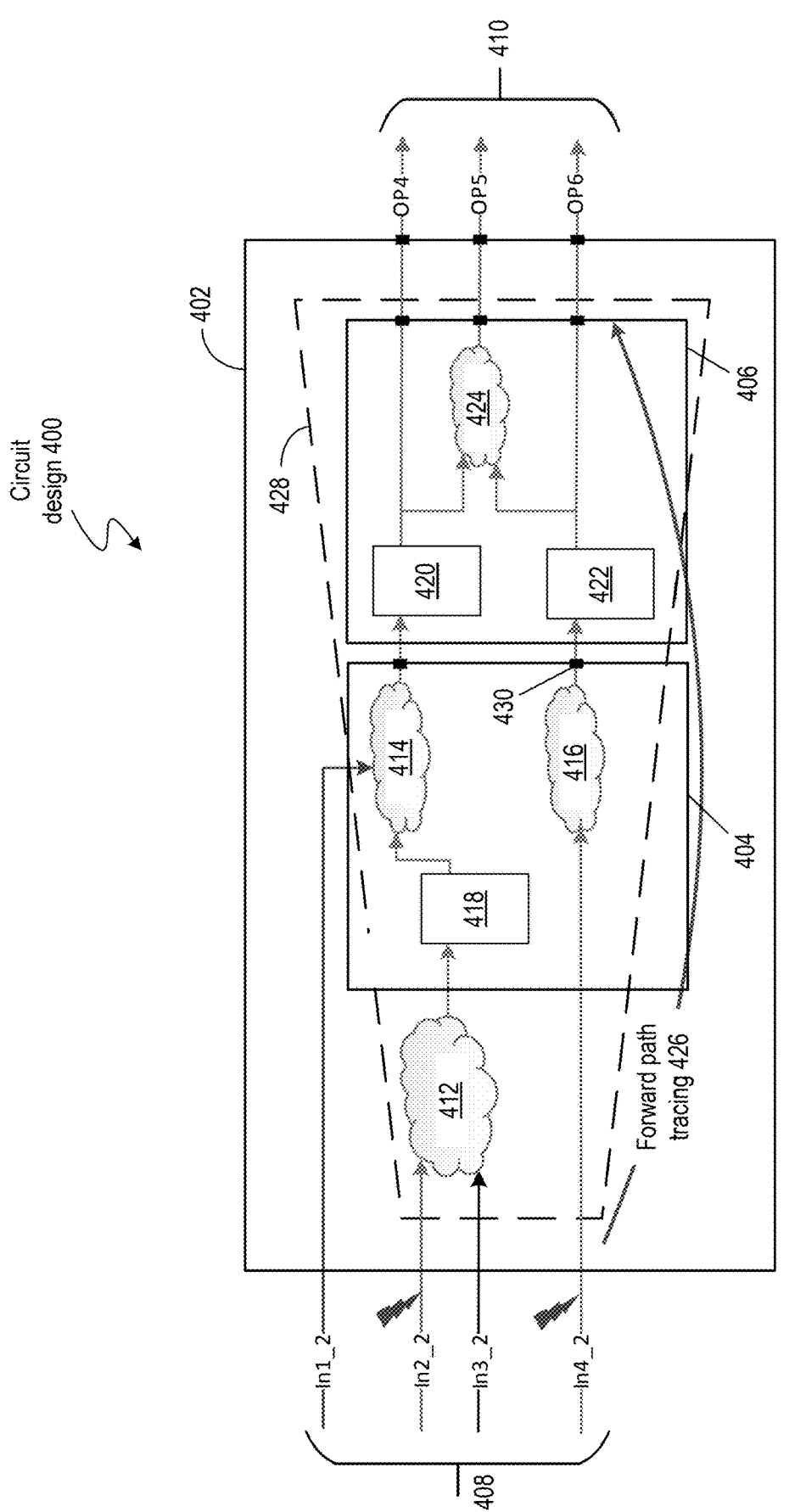
FIG. 4 illustrates identifying circuit elements and/or ports impacted by a set of input ports in accordance with some embodiments described herein.

FIG. 4 illustrates identifying circuit elements and/or ports impacted by a set of input ports in accordance with some embodiments described herein.

Circuit design 400 may include a top-level hierarchical circuit block 402. Top-level hierarchical circuit block 402 may include circuitry 412, circuit blocks 404 and 406, input ports 408 (In1_2, In2_2, In3_2, and In4_2), and output ports 410 (OP4, OP5, and OP6). Circuit block 404 may include circuitries 414 and 416, and circuit element 418 (e.g., a flip-flop). Circuit block 406 may include circuit elements 420 and 422 (e.g., flip-flops) and circuitry 424.

A set of input ports of circuit design 400 may be identified as vulnerable input ports. For example, input ports In2_2 and In4_2 may be identified as vulnerable input ports. Forward path tracing 426 may be used to generate a forward cone of influence for each input port, and the multiple forward cones of influence may be merged (e.g., by performing a set union operation) to create forward trapezoid of influence 428 from input ports In2_2 and In4_2. The forward trapezoid of influence may span across multiple hierarchies in the circuit design. For example, forward trapezoid of influence 428 spans across circuit blocks 404 and 406 and the top-level hierarchical block 402.

In some embodiments described herein, a report may be generated which includes ports and circuit elements which are in the forward trapezoid of influence. For example, the report may include input ports In2_2 and In4_2 (but may not include input ports In1_2 and In3_2), circuitries 412, 414, 416, and 424, and circuit elements (e.g., flip-flops) 418, 420, and 422, and output ports OP4, OP5, and OP6. In particular, the registers or flip-flops that are within the forward trapezoid of influence may be included in the report. Ports of circuit blocks at lower levels of hierarchies (e.g., port 430 of circuit block 404) may also be included in the report.

In some embodiments described herein, the path tracing may be based on or aware of the state or mode of the circuit. In other words, the path tracing may only be performed in portions of the circuit that are in the "active" or "on" state. For example, suppose circuitry 326 in FIG. 3 in an "on" state in a first mode (e.g., a normal operation mode), but is in an "off" state in a second mode. In this example, forward cone of influence 330 will include circuitry 326 and output port OP2 in the first mode but will not include circuitry 326 and output port OP2 in the second mode.

Specifically, in both the first mode and the second mode, forward path tracing 328 may begin at input port In2_1, and trace input-to-output arcs to reach circuit element 322. In the first mode, forward path tracing 328 may continue to trace input-to-output arcs through circuitry 326 to reach output port OP2 because circuitry 326 is in the "on" state in the first mode. However, in the second mode, forward path tracing 328 may not trace input-to-output arcs through circuitry 326 because circuitry 326 is in the "off" state in the second mode. Forward path tracing 328 may reach OP1 because the tracing path does not pass through circuitry 326. However, forward path tracing 328 may not reach OP2 because the tracing path passes through circuitry 326 which is in the "off" state in the second mode.

In some embodiments described herein, a report may be generated which includes ports and/or circuit elements in a mode-aware forward cone or trapezoid of influence and/or a mode-aware backward cone or trapezoid of influence. Specifically, the report may include multiple sections, where each section may correspond to a mode, and where each section may include ports and/or circuit elements which were identified by using mode-aware path tracing.

Some embodiments described herein may compute probability values for controllability and observability during path tracing and include the probability values in a report. Probabilities for controllability may be propagated in the forward direction from a set of inputs to a set of outputs. Probabilities for observability may be propagated in the backward direction from the output to the set of inputs. Formulas for propagating probability values for an AND gate and an OR gate is shown in the following table.

| Gate Type | Formula for computing C0out | Formula for computing C1out | Formula for computing observability probabilities |
|---|---|---|---|
| AND | C0out = 1 – C1out | C1out = Product of all C1in | Obs. of each input = Obs. of output * product of C1 probabilities of all other inputs |
| OR | C0out = Product of all C0in | C1out = 1 – C0out | Obs. of each input = Obs. of output * product of C0 probabilities of all other inputs |

For a logic gate, "C0in" refers to the controllability probability associated with a logic value "0" at an input port, "C1in" refers to the controllability probability associated with a logic value "1" at the input port, "C0out" refers to the controllability probability associated with a logic value "0" at an output port, and "C1out" refers to the controllability probability associated with a logic value "1" at the output port.

The formula "C1out=Product of all C1in" states that the probability of C1out for an AND gate is equal to the product of the probabilities of each input of the AND gate being equal to a logic "1." Likewise, the formula "C0out=Product of all C0in" states that the probability of C0out for an OR gate is equal to the product of the probabilities of each input of the OR gate being equal to a logic "0."

Once the controllability probabilities are propagated from the input ports to the output port, the output port may be assigned an observability probability of 1. The controllability probabilities may then be used to propagate observability probabilities backward from the output port to the input ports. The formula "Obs. of each input=Obs. of output * product of C1 probabilities of all other inputs" for an AND gate states that the observability probability of an input of the AND gate is equal to the product of (1) the observability probability of the output of the AND gate and (2) a product of the C1 controllability probabilities associated with the other inputs of the AND gate. The formula "Obs. of each input=Obs. of output * product of C0 probabilities of all other inputs" for an OR gate states that the observability probability of an input of the OR gate is equal to the product of (1) the observability probability of the output of the OR gate and (2) a product of the C0 controllability probabilities associated with the other inputs of the OR gate.

Figure 5A:
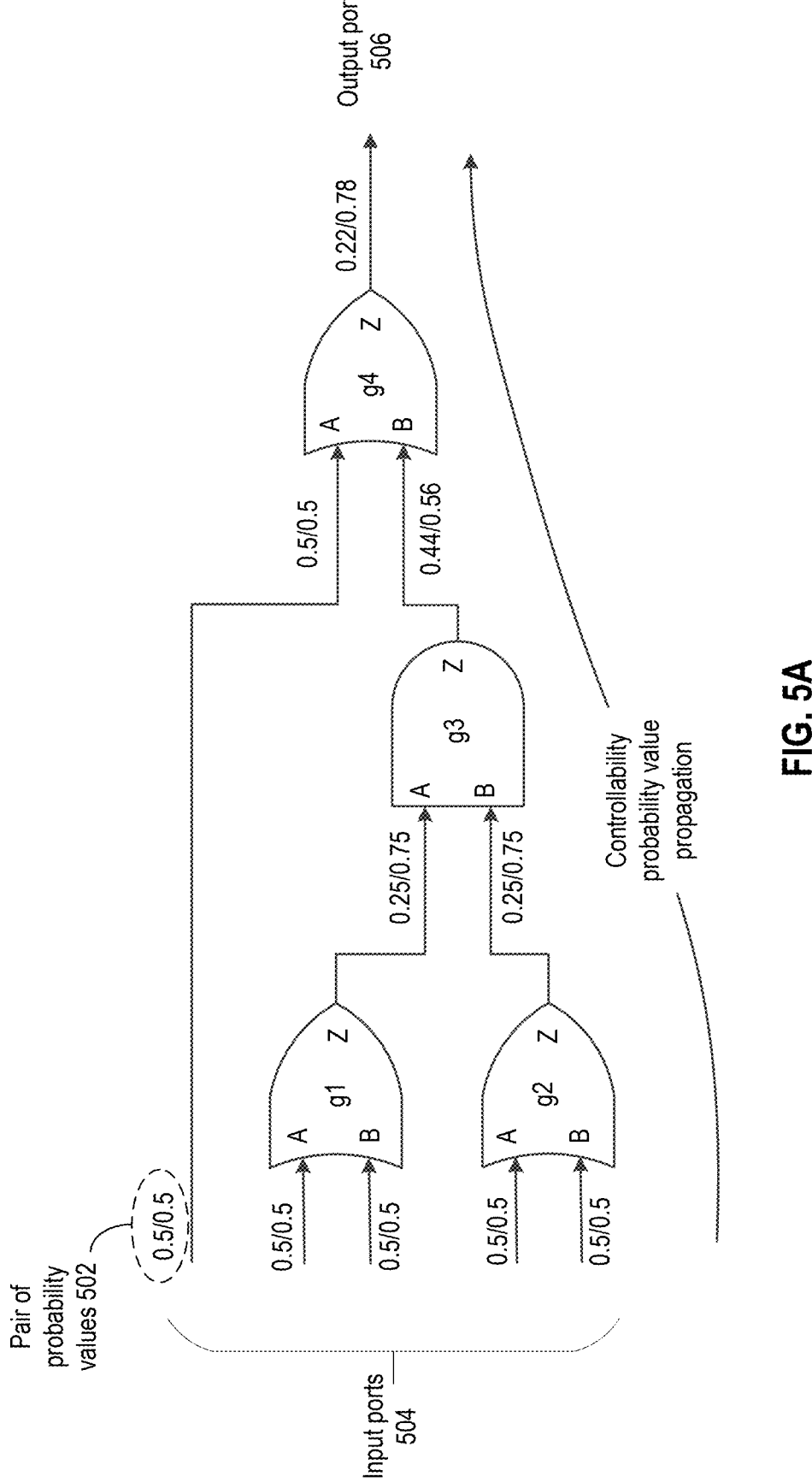
FIGS. 5A-5B illustrates computing probability values for controllability and observability in accordance with some embodiments described herein.
Figure 5B:
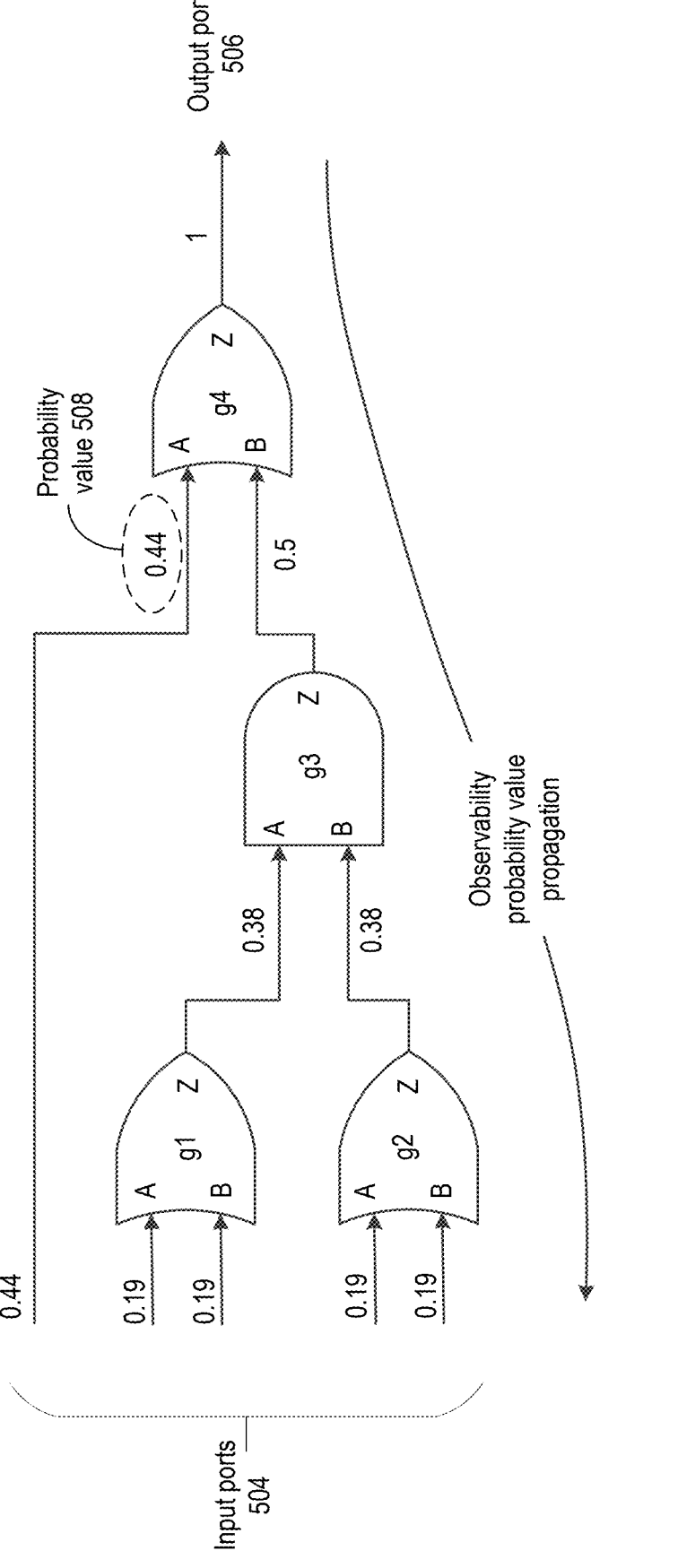

FIGS. 5A-5B illustrates computing probability values for controllability and observability in accordance with some embodiments described herein.

A circuit having input ports 504, output port 506, and including gates g1, g2, g3, and g4 is illustrated in FIGS. 5A-5B. FIG. 5A illustrates computing controllability probability values by starting at the input ports 504 and propagating controllability probability values forward to output port 506 and FIG. 5B illustrates computing observability probability values by starting at output port 506 and propagating observability probability values backward to input ports 504.

In FIG. 5A, each port is associated with a pair of probability values, where the first value corresponds to the probability that the port is a logic "0" and the second value corresponds to the probability that the port is a logic "1." For example, pair of probability values 502 is associated with input port "A" of gate g4. The input ports may be assigned initial probability values for logic "0" and "1." In FIG. 5A, a 0.5/0.5 probability has been used for initialization, but in general any pair of probability values (which sum to 1) may be used. The pair of probability values 0.5/0.5 on the input ports of OR gate g1 may be used to compute the pair of probability values at the output port of OR gate g1 by using the formula shown in the table above. Specifically, the formula "C0out=Product of all C0in" may be used to compute the probability that the output port of OR gate g1 is a logic "0." Specifically, C0out=0.5×0.5=0.25, and C1out=1−C0out=0.75. Accordingly, the pair of probabilities 0.25/0.75 is shown at the output of OR gate g1. The controllability probability values may be propagated in this manner to output port 506.

In FIG. 5B, each port is associated with an observability probability value. For example, probability value 508 is the observability probability of input port "A" of gate g4. The output port may be assigned an observability probability of "1." The observability probability of the input ports may then be computed by using the formula shown in the able above. For example, the observability probability of input port "A" of OR gate g4 may be computed using the formula "Obs. of each input=Obs. of output * product of C0 probabilities of all other inputs." Specifically, the observability probability of input port "A" of OR gate g4 is equal to the observability probability of the output port of OR gate g4 (which is equal to 1) and the product of the logic "0" probability of input port "B" (which is equal to 0.44 as shown in FIG. 5A). In other words, the observability probability of input port "A" of OR gate g4 is equal to 0.44. The observability probability values may be propagated in this manner to input ports 504.

The observability probability associated with a port may correspond to the probability that a malicious actor is able to affect the output if the malicious actor is able to successfully compromise the port. For example, input port "A" of logic gate g1 in FIG. 5B has an observability probability of 0.19. Thus, if a malicious actor has compromised input port "A" of logic gate g1 (i.e., the malicious actor can provide any signal desired by the malicious user at input port "A" of logic gate g1), then there is a 0.19 probability that the malicious actor will be able to generate an undesired output value at output port 506. On the other hand, input port "A" of logic gate g4 in FIG. 5B has an observability probability of 0.44. Thus, if a malicious actor has compromised input port "A" of logic gate g4 (i.e., the malicious actor can provide any signal desired by the malicious user at input port "A" of logic gate g4), then there is a 0.44 probability that the malicious actor will be able to generate an undesired output value at output port 506. Clearly, input port "A" of logic gate g4 poses a greater threat than input port "A" of logic gate g1.

In some embodiments described herein, the observability probability values may be used to rank or filter ports and/or circuit elements in a report. For example, forward path tracing and/or backward path tracing may be used to identify a set of potentially vulnerable ports and/or circuit elements. Observability probabilities for the ports in the circuit design may be computed. The set of potentially vulnerable ports and/or circuit elements may then be ranked based on the observability probabilities. Specifically, ports and/or circuit elements with higher observability probabilities may be ranked above ports and/or circuit elements with lower observability probabilities.

In some embodiments described herein, forward path tracing and/or backward path tracing may be used to identify a set of potentially vulnerable ports and/or circuit elements. Threat detection circuitry may then be added to monitor and detect attacks at the set of potentially vulnerable ports and/or circuit elements. Specifically, the threat detection circuitry may monitor the signal value at a vulnerable port and/or circuit element. The monitored signal value may be compared with an expected signal value, and an alarm may be generated if the signal value at the vulnerable port and/or circuit element is different from the expected value.

In some embodiments described herein, the observability probability values may be used to select ports and/or circuit elements where threat detection circuitry is added. For example, forward path tracing and/or backward path tracing may be used to identify a set of potentially vulnerable ports and/or circuit elements. Observability probabilities for the ports in the circuit design may be computed. Threat detection circuitry may be added for a port or a circuit element if the observability probability associated with the port or circuit element is greater than a threshold observability probability. Using a threshold observability probability may substantially reduce the amount of threat detection circuitry that is added to the circuit design without substantially reducing security.

In some embodiments described herein, a hardware description language representation of a circuit design may be received. Logic synthesis may be performed to generate a gate-level representation of the circuit design. Controllability and observability probability values may be computed based on the gate-level representation of the circuit design. Probability values computed at input and/or output ports in the gate-level representation may be associated with corresponding input and/or output ports in the hardware description language representation. Ports and/or circuit elements in the hardware description language representation of the circuit design may be selected, ranked, and/or filtered based on the associated probability values.

FIG. 6 illustrates a process for identifying circuit elements and/or ports for threat analysis and risk assessment in accordance with some embodiments described herein.

A first set of ports and/or circuit elements in a circuit design may be received, where the first set of ports and/or circuit elements is expected to cause damage if the first set of ports and/or circuit elements is compromised (at 602). For example, circuit element 212 in FIG. 2 may store an encryption key or may control braking in an automobile. Thus, serious damage (e.g., leakage of sensitive data or a car crash) may occur if circuit element 212 is compromised.

A second set of ports and/or circuit elements in the circuit design may be determined by performing forward path tracing from the first set of ports and/or circuit elements, backward path tracing from the first set of ports and/or circuit elements, or both forward and backward path tracing from the first set of ports and/or circuit elements (at 604). For example, the second set of ports and/or circuit elements may include ports and circuit elements in backward cone of influence 220 and forward cone of influence 216.

A report may be generated based on the second set of ports and/or circuit elements in the circuit design, where the report may identify one or more of threat scenarios and damage scenarios in the circuit design (at 606). The report may be used for performing threat analysis and risk assessment for the circuit design.

In some embodiments described herein, the circuit design may have multiple modes, where different portions of the circuit design are activated in each mode. For example, circuitry 326 may be activated (i.e., circuitry 326 may be in an "on" state) in a first mode, but may be deactivated (i.e., circuitry 326 may be in an "off" state) in a second mode. For each mode, the forward path tracing from the first set of ports and/or circuit elements, backward path tracing from the first set of ports and/or circuit elements, or both forward and backward path tracing from the first set of ports and/or circuit elements may be performed only on activated portions of the circuit design. For example, path tracing may not be performed through circuitry 326 in the second mode. In some embodiments described herein, the report may include multiple sections, and where each section corresponds to a mode.

In some embodiments described herein, observability probabilities associated with the second set of ports and/or circuit elements may be computed. In these embodiments, the report may include the observability probabilities. In some embodiments, the report may rank the second set of ports and/or circuit elements based on the observability probabilities. In some embodiments, the report may include a subset of the second set of ports and/or circuit elements which have observability probabilities that are greater than a threshold observability probability.

In some embodiments described herein, threat detection circuitry may be added for a subset of the second set of ports and/or circuit elements which have observability probabilities that are greater than a threshold observability probability.

Figure 7:
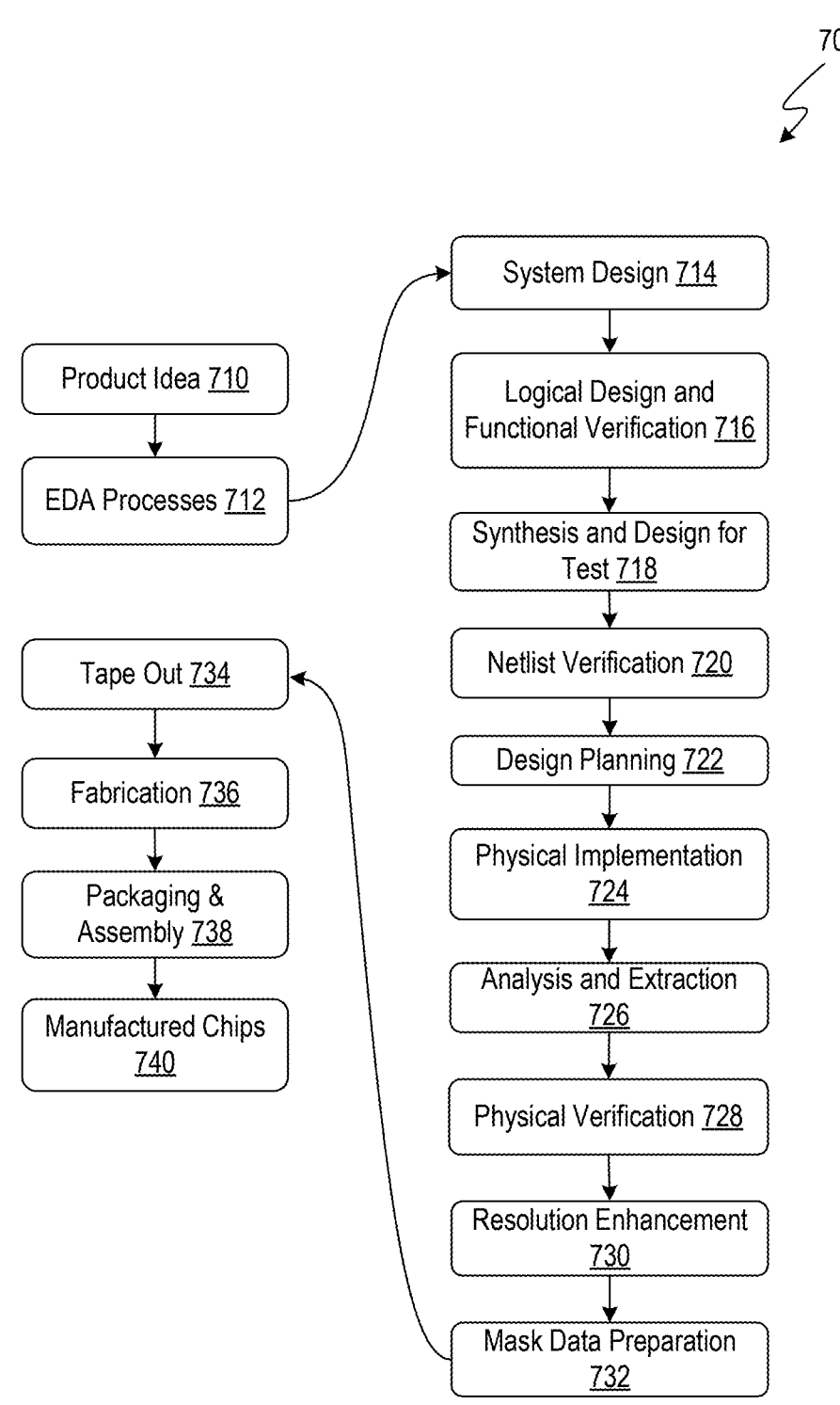
FIG. 7 illustrates an example set of processes 700 used during the design, verification, and fabrication of an article of manufacture such as an integrated circuit to transform and verify design data and instructions that represent the integrated circuit.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
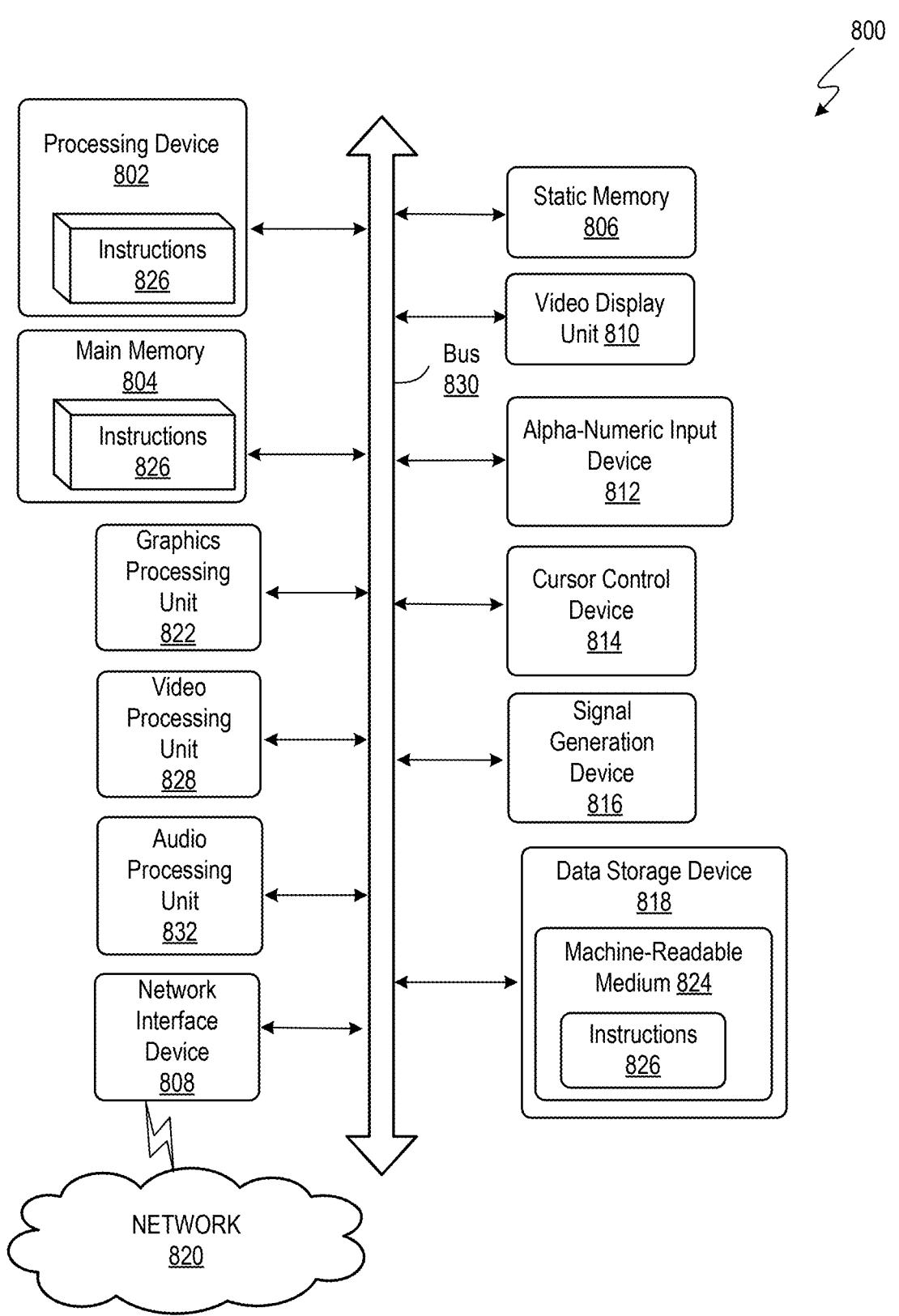
FIG. 8 illustrates an example machine of a computer system 800 within which a set of instructions, for causing the machine to perform any one or more of the methodologies discussed herein, may be executed.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
receiving a first set of one or more ports and circuit elements in a circuit design, wherein the first set of one or more ports and circuit elements is expected to cause damage if the first set of one or more ports and circuit elements is compromised, and wherein compromising a first port in the first set of one or more ports and circuit elements allows exploitation of the first port by a user;
determining a second set of one or more ports and circuit elements in the circuit design by performing one or more of (1) forward path tracing from the first set of one or more ports and circuit elements and (2) backward path tracing from the first set of one or more ports and circuit elements; and
generating, by a processor, a report based on the second set of one or more ports and circuit elements in the circuit design, wherein the report identifies one or more of threat scenarios and damage scenarios in the circuit design.

2. The method of claim 1, wherein the circuit design has multiple modes, wherein different portions of the circuit design are activated in each mode, and wherein for each mode, the one or more of (1) the forward path tracing from the first set of one or more ports and circuit elements and (2) the backward path tracing from the first set of one or more ports and circuit elements is performed only on the activated portions of the circuit design.

3. The method of claim 2, wherein the report includes multiple sections, and wherein each section corresponds to a mode.

4. The method of claim 1, further comprising computing observability probabilities associated with the second set of one or more ports and circuit elements, and wherein the report includes the observability probabilities.

5. The method of claim 4, wherein the report ranks the second set of one or more ports and circuit elements based on the observability probabilities.

6. The method of claim 4, wherein the report includes a subset of the second set of one or more ports and circuit elements which have observability probabilities that are greater than a threshold observability probability.

7. The method of claim 4, further comprising adding threat detection circuitry for a subset of the second set of one or more ports and circuit elements which have observability probabilities that are greater than a threshold observability probability.

8. A non-transitory computer-readable medium comprising stored instructions, which when executed by a processor, cause the processor to:
receive a first set of one or more ports and circuit elements in a circuit design, wherein the first set of one or more ports and circuit elements is expected to cause damage if the first set of one or more ports and circuit elements is compromised, and wherein compromising a first port in the first set of one or more ports and circuit elements allows exploitation of the first port by a user;
determine a second set of one or more ports and circuit elements in the circuit design by performing one or more of (1) forward path tracing from the first set of one or more ports and circuit elements and (2) backward path tracing from the first set of one or more ports and circuit elements; and
generate a report based on the second set of one or more ports and circuit elements in the circuit design, wherein the report identifies one or more of threat scenarios and damage scenarios in the circuit design.

9. The non-transitory computer-readable medium of claim 8, wherein the circuit design has multiple modes, wherein different portions of the circuit design are activated in each mode, and wherein for each mode, the one or more of (1) the forward path tracing from the first set of one or more ports and circuit elements and (2) the backward path tracing from the first set of one or more ports and circuit elements is performed only on activated portions of the circuit design.

10. The non-transitory computer-readable medium of claim 9, wherein the report includes multiple sections, and wherein each section corresponds to a mode.

11. The non-transitory computer-readable medium of claim 8, wherein the stored instructions, which when executed by the processor, cause the processor to compute observability probabilities associated with the second set of one or more ports and circuit elements, and wherein the report includes the observability probabilities.

12. The non-transitory computer-readable medium of claim 11, wherein the report ranks the second set of one or more ports and circuit elements based on the observability probabilities.

13. The non-transitory computer-readable medium of claim 11, wherein the report includes a subset of the second set of one or more ports and circuit elements which have observability probabilities that are greater than a threshold observability probability.

14. The non-transitory computer-readable medium of claim 11, wherein the stored instructions, which when executed by the processor, cause the processor to add threat detection circuitry for a subset of the second set of one or more ports and circuit elements which have observability probabilities that are greater than a threshold observability probability.

15. An apparatus, comprising:
a memory storing instructions; and
a processor, coupled with the memory and to execute the instructions, the instructions when executed causing the processor to:
receive a first set of one or more ports and circuit elements in a circuit design, wherein the first set of one or more ports and circuit elements is expected to cause damage if the first set of one or more ports and circuit elements is compromised, and wherein compromising a first port in the first set of one or more ports and circuit elements a lows exp Joi of the first port by a user;

determine a second set of one or more ports and circuit elements in the circuit design by performing one or more of (1) forward path tracing from the first set of one or more ports and circuit elements and (2) backward path tracing from the first set of one or more ports and circuit elements;
compute observability probabilities associated with the second set of one or more ports and circuit elements; and
generate a report based on the second set of one or more ports and circuit elements in the circuit design, wherein the report includes the observability probabilities, and wherein the report is used for performing threat analysis and risk assessment for the circuit design.

16. The apparatus of claim 15, wherein the circuit design has multiple modes, wherein different portions of the circuit design are activated in each mode, and wherein for each mode, the one or more of (1) the forward path tracing from the first set of one or more ports and circuit elements and (2) backward path tracing from the first set of one or more ports and circuit elements is performed only on activated portions of the circuit design.

17. The apparatus of claim 16, wherein the report includes multiple sections, and wherein each section corresponds to a mode.

18. The apparatus of claim 15, wherein the report ranks the second set of one or more ports and circuit elements based on the observability probabilities.

19. The apparatus of claim 15, wherein the report includes a subset of the second set of one or more ports and circuit elements which have observability probabilities that are greater than a threshold observability probability.

20. The apparatus of claim 15, wherein the stored instructions, which when executed by the processor, cause the processor to add threat detection circuitry for a subset of the second set of one or more ports and circuit elements which have observability probabilities that are greater than a threshold observability probability.

* * * * *